United States Patent [19]

Müller et al.

[11] Patent Number: 4,790,210

[45] Date of Patent: Dec. 13, 1988

[54] BEARING OF AN IDLER GEAR OF AN ALL-WHEEL TRANSFER TRANSMISSION

[75] Inventors: Robert Müller, Mönsheim; Peter Hoebel, Wiernsheim-Serres; Ulrich Maier, Freiberg, all of Fed. Rep. of Germany

[73] Assignee: Dr. Ing. h.c.F. Porsche Aktiengesellschaft, Fed. Rep. of Germany

[21] Appl. No.: 97,719

[22] Filed: Sep. 17, 1987

[30] Foreign Application Priority Data

Feb. 21, 1987 [DE] Fed. Rep. of Germany ....... 3705606

[51] Int. Cl.[4] .................... F16C 35/06; F16H 37/06; F16H 57/02
[52] U.S. Cl. ............................ 74/665 GA; 74/421 R; 384/562; 384/571; 384/583
[58] Field of Search .................. 74/421 R, 665 GA; 180/233, 247; 384/571, 562, 583, 585, 626

[56] References Cited

U.S. PATENT DOCUMENTS

| 2,407,532 | 9/1946 | Boden | 384/503 X |
| 2,827,798 | 3/1958 | Lucia et al. | 74/421 R X |
| 4,014,221 | 3/1977 | Eastwood | 74/665 GA |
| 4,225,026 | 9/1980 | Yamamori et al. | 192/70.2 |
| 4,602,876 | 7/1986 | Miki et al. | 384/585 |

FOREIGN PATENT DOCUMENTS 3604143 9/1986 Fed. Rep. of Germany .

Primary Examiner—Allan D. Herrmann
Attorney, Agent, or Firm—Barnes & Thornburg

[57] ABSTRACT

A bearing of an idler gear of an all-wheel transfer transmission that mates with a drive gear wheel and an output gear wheel to one vehicle axle is provided with a bush that is clamped in between two housing walls. The idler gear is disposed on tapered roller bearings which are disposed on the bush. A screw that passes centrally through the bush is tightened by a nut and as a result braces the inner races of the tapered roller bearings and places the tapered rollers without play against the running surfaces of the idler gear.

7 Claims, 1 Drawing Sheet

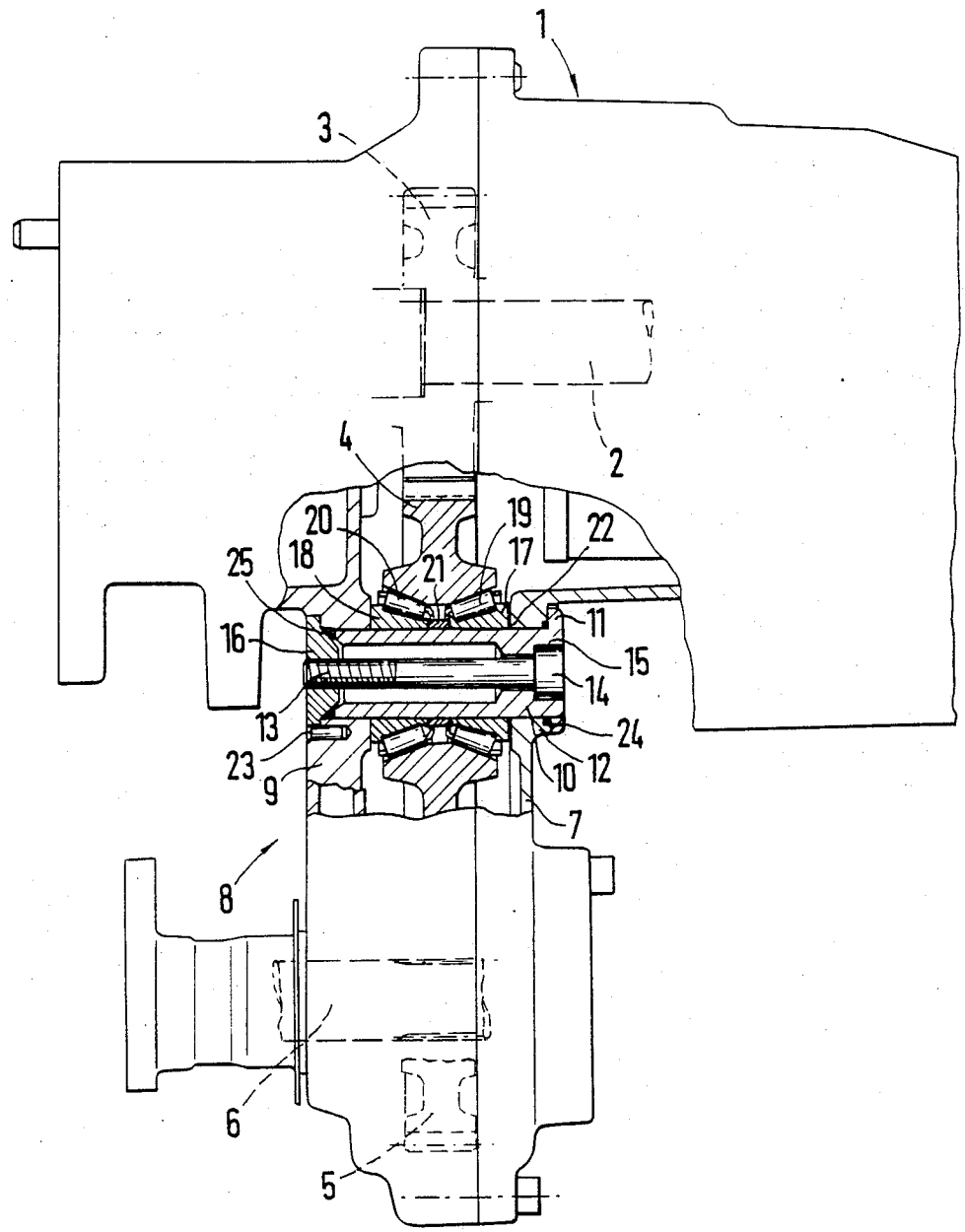

BEARING OF AN IDLER GEAR OF AN ALL-WHEEL TRANSFER TRANSMISSION

BACKGROUND AND SUMMARY OF THE INVENTION

The present invention relates to the bearing of an idler gear in an all-wheel transfer transmission of a motor vehicle. The idler gear is disposed between first and second casing walls of a transmission case and mate with both a drive gear wheel originating from the locking system and an output gear driving one vehicle axle.

In an all-wheel transfer transmission shown in German Published Unexamined Patent Application No. 3,604,143, the distance between the axes of the drive shaft originating from the all-wheel locking system and of the output shaft driving one vehicle axle must be relatively large in order to be able to laterally move this output shaft past the large-volume housing of the gearshift transmission. If large gear wheels that mate with one another were used on the drive shaft and on the output shaft, the two vehicle axles would be driven in different rotating directions. A transfer transmission is therefore used that comprises a gear wheel of the drive shaft, an idler gear and a gear wheel on the output shaft.

It is an objective of the invention to provide a bearing for the idler gear of such an arrangement that can be manufactured cost-effectively and in a simple manner ensures a bearing adjustment that is free from play, as well as the concentric running of the idler gear.

This and other objectives are achieved in the present invention by providing a bearing for an idler gear which has a bush on which the idler gear is disposed. This bush has at least one side with a stop collar which rests against one casing wall. The other side of the bush is axially braced on the outside with respect to the other casing wall by means of a tightenable connection.

If the idler gear is disposed on a bush that, by means of a screwed connection, axially braces the two casing walls of the transmission casing with one another, when the screwed connection is tightened, the axial play of the bearing clamped in between the two casing walls is made to equal zero.

In an advantageous embodiment of the present invention, for the tightenable connection, a screwed connection is used with a screw that passes through the center of the bush and with its head, in the area of one casing wall, rests against the bush and that by means of a nut from the outside is braced with respect to the other casing side. In this embodiment, the bush that is fitted into a smooth through-bore of the transmission casing, with a stop collar, is placed against one side of the casing. The transmission casing which can be constructed of light metal and the casing walls of which are elastically bendable, is reinforced by the bush when the screwed connection is tightened and therefore causes less noise-generating sound radiation.

When the idler gear is disposed on tapered roller bearings, the tightening of the tightenable connection ensures a precise concentricity. In an advantageous embodiment, the hub of the idler gear is a joint outer race of the tapered roller bearings and directly represents the running surface of the tapered roller bearings. Via the inner races of the tapered roller bearings that are clamped in between the two casing walls and the spacer that is disposed between them and in its length is precisely tolerated, the tapered rollers, when the tightenable connection is tightened, are placed against the idler gear so that the radial play of the bearing becomes zero.

Other objects, advantages and novel features of the present invention will become apparent from the following detailed description of the invention when considered in conjunction with the accompanying drawings.

BRIEF DESCRIPTION OF THE DRAWING

The single drawing FIGURE shows a bearing of an idler gear constructed in accordance with a preferred embodiment of the present invention.

DETAILED DESCRIPTION OF THE DRAWINGS

The FIGURE shows a drive shaft 2 originating from an all-wheel differential transmission 1, on which a drive gear wheel 3 is torsionally fixed. This drive gear wheel 3, together with an idler gear 4 and an output gear wheel 5 torsionally fixed on an output shaft 6, forms a transfer transmission for the drive of one vehicle axle that is enclosed by a transmission casing 8. One casing wall 7 of the transmission casing 8 is flanged onto the other casing wall 9 that in a preferred embodiment is cast of light metal in one piece with the overall transmission housing.

A bush 10 is fitted into a smoothly penetrating bore through the two casing walls 7 and 9. This bush 10 has a stop collar 11 which rests against an outer lug 12 of one casing wall 7. A hexagon socket screw 13 passes centrally through the bush 10, the head 14 of this screw 13 being disposed in a hollowed-out space 15 of the bush 10. By means of a nut 16 that on the outside rests against the other casing wall 9, the two casing walls 7, 9 are braced with respect to one another. As a result, the two casing walls 7, 9 at the same time also brace the inner races 17 and 18 of tapered roller bearings 19 and 20 located between them as well as a spacer 21. By means of an adjusting disk 22 located between the inner race 17 and one casing wall 7, rough tolerance imprecisions are balanced by means of the selection of a certain disk thickness. Since one casing wall 7 is developed to be elastically bending, by the tightening of the screwed connection 13, 16, this casing wall 7 is deformable to such an extent that the axial play becomes zero and the inner races 17, 18 of the tapered roller bearings 19, 20 are braced between the casing walls 7, 9. At the same time, the rollers of the tapered roller bearings 19, 20 are placed against the conical running surfaces of the idler gear 4 and the radial play is eliminated.

The nut 16 is secured against twisting in the illustrated preferred embodiment by a pin 23 fastened in the casing wall 9. The nut 16 therefore does not have to be held when the screw 13 is tightened. The splash oil that is thrown off by the gear wheels 3, 4, 5 into the transmission casing 8 is sufficient for the lubrication of the tapered roller bearings 19, 20. In order to prevent a discharge of oil to the outside at the bush 10, an O-ring 24 is inserted between the stop collar 11 of the bush 10 and the lug 12 of one casing wall 7, and another O-ring 25 is inserted between the end face of the bush 10 and the nut 16.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A bearing of an idler gear of an all-wheel transfer transmission, said idler gear being disposed between first and second casing walls of a transmission case and mating with both a driven gear wheel originating from an all-wheel locking system and an output gear wheel driving one vehicle axle, comprising:
   a bush on which said idler gear is disposed, said bush having at least one side with a stop collar which rests against said first casing wall and another side which is axially braced on the outside with respect to said second casing wall; and
   tightenable connection means for axially bracing said bush with respect to said second casing wall,
   wherein said tightenable connection means is a screwed connection means comprising a screw that passes centrally through said bush and a nut, said screw having a head which forces said stop collar against said first casing wall, said nut resting against said second casing wall, and
   wherein said first and second casing walls include a bore through which said bush is fitted, and further comprising O-rings for sealing off said bore with respect to said first and second casing walls, wherein said O-ring which seals off said second casing wall is between said nut and an end face of said bush.

2. A bearing according to claim 1, further comprising two tapered roller bearing means for bearing said idler gear on said bush.

3. A bearing according to claim 2, wherein said idler gear has a hub of said idler gear which is a joint outer race for both said tapered roller bearing means.

4. A bearing according to claim 3, further comprising inner races for said tapered roller bearing means and spacer means which are braced from the inside with respect to both casing walls by said screwed connection means.

5. A bearing according to claim 4, wherein at least one of said casing walls is elastically bendable such that said bearing is adjusted free from play by said bracing by said screwed connection means.

6. A bearing according to claim 5, further comprising an adjusting disk between said inner race of one of said tapered roller bearing means and one of said casing walls.

7. A bearing according to claim 1, further comprising a pin for securing the nut against twisting.

* * * * *